Figure 1:
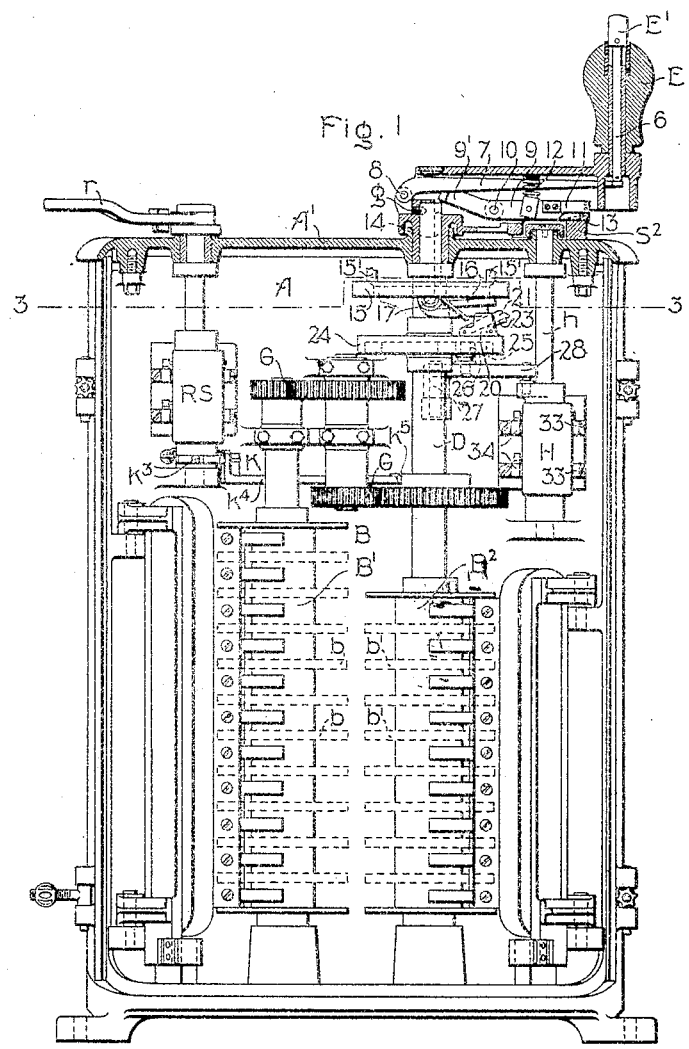

No. 779,199. PATENTED JAN. 3, 1905.
C. E. BARRY.
MOTOR CONTROLLER.
APPLICATION FILED SEPT. 24, 1903. RENEWED MAY 21, 1904.

3 SHEETS—SHEET 1.

Witnesses:

Inventor:
Charles E. Barry.
by
Atty.

No. 779,199. PATENTED JAN. 3, 1905.
C. E. BARRY.
MOTOR CONTROLLER.
APPLICATION FILED SEPT. 24, 1903. RENEWED MAY 21, 1904.
3 SHEETS—SHEET 2.
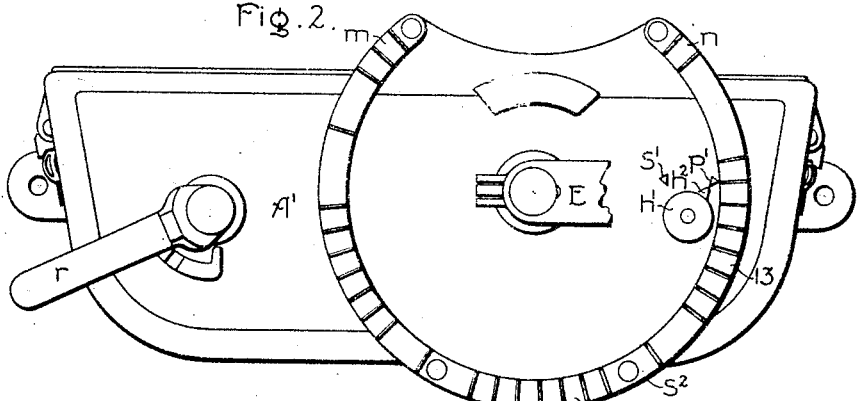
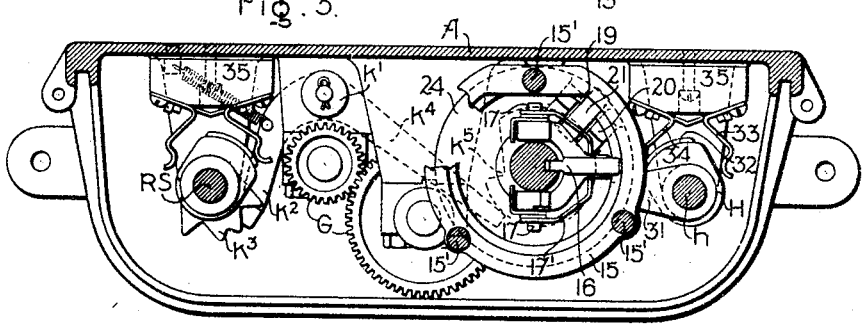
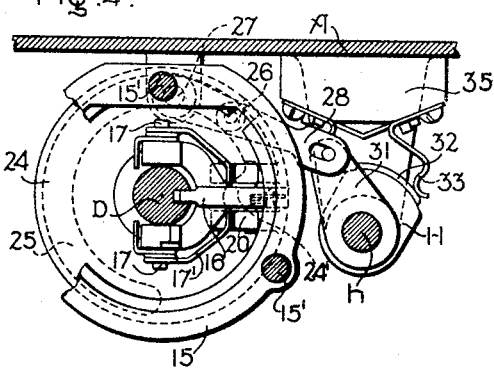
Witnesses:
Harry A. Tilden.
Helen Oxford
Inventor:
Charles E. Barry.
by Albert H. Davis
Atty.

No. 779,199. PATENTED JAN. 3, 1905.
C. E. BARRY.
MOTOR CONTROLLER.
APPLICATION FILED SEPT. 24, 1903. RENEWED MAY 21, 1904.
3 SHEETS—SHEET 3.
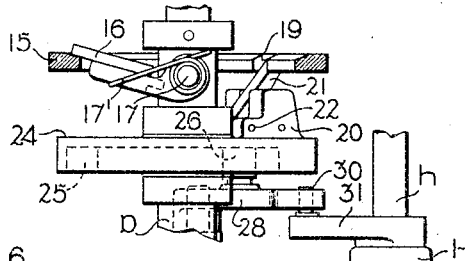
Fig. 5
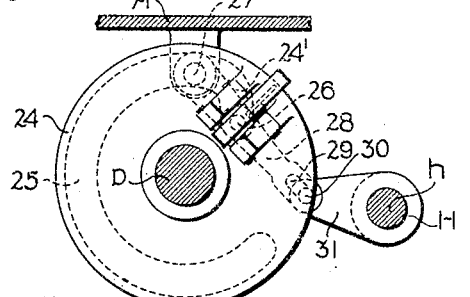
Fig. 6
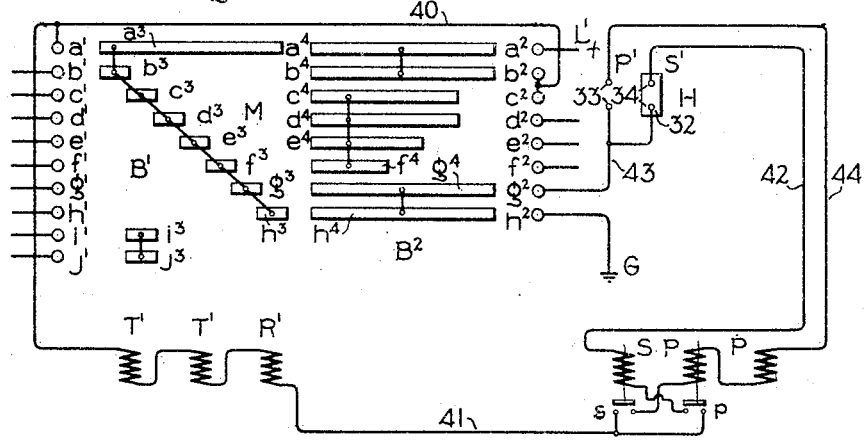
Fig. 7
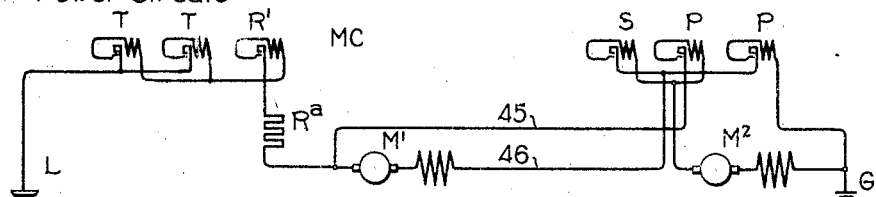
Witnesses:
Harry H. Tilden.
Helen Orford
Inventor:
Charles E. Barry.
by Albert G. Davis
Att'y.

No. 779,199.

Patented January 3, 1905.

UNITED STATES PATENT OFFICE.

CHARLES E. BARRY, OF SCHENECTADY, NEW YORK, ASSIGNOR TO GENERAL ELECTRIC COMPANY, A CORPORATION OF NEW YORK.

MOTOR-CONTROLLER.

SPECIFICATION forming part of Letters Patent No. 779,199, dated January 3, 1905.

Application filed September 24, 1903. Renewed May 21, 1904. Serial No. 209,045.

*To all whom it may concern:*

Be it known that I, CHARLES E. BARRY, a citizen of the United States, residing at Schenectady, in the county of Schenectady and State of New York, have invented certain new and useful Improvements in Motor-Controllers, of which the following is a specification.

My invention relates to improvements in controllers for electric motors, and more particularly to the construction and arrangement of master-controllers, such as are used in train-control systems, locomotives, and the like.

The object of my invention is to provide a simple, compact, and reliable controller, which will be capable of controlling the motors with facility, with the greatest possible economy of power, and in such a way that maximum traction may always be obtained when desired.

In the operation of electric trains or in the operation of heavy locomotives which employ a plurality of motors it is a well-understood fact that the best and most efficient way of starting is to connect the motors in series; but when the track is slippery it sometimes happens that one set of wheels will slip and the motor or motors connected therewith will revolve so rapidly and generate such a counter-electromotive force that the current furnished to the other motors connected in series therewith will be cut down and very little tractive force will be obtained. In such cases and also when for any other reason a maximum amount of tractive force is desired at the start, it is customary to connect the motors in multiple without first connecting them in series.

My invention consists of a motor-controller comprising a resistance-controlling device, an auxiliary controlling device, such as a series-parallel switch, which is arranged when in one position to cause the motors to be connected in series, and when in another position to cause the motors to be connected in parallel, and means whereby said auxiliary controlling device is maintained in one position or moved into the other, as desired, as the operating-handle for said resistance-controlling device is moved forward through its initial or "off" position. Means are also provided for locking said auxiliary controlling device in the latter position throughout all subsequent positions of the operating-handle.

More particularly stated, my invention consists of a motor-control system comprising a plurality of motors, a motor-controller of the separately-actuated contact type, and a master-controller for said motor-controller including a resistance-controlling switch, a handle for operating said switch, and a series-parallel switch controlled from said handle, adapted when in one position to cause said motor-controller to connect the motors in series and when in another position to cause said motor-controller to connect the motors in parallel as said handle is moved forward from its off position. The connections between the series-parallel switch and the operating-handle are so constructed and arranged that if the said handle is moved forward without depressing the button carried by said handle the series-parallel switch will not be operated and the motors will be connected in series; but if the said button is depressed before the said handle is started from its off position, the series-parallel switch will be moved into its parallel position as the handle is moved forward and the motors will be connected in parallel.

My invention further consists of improvements in the detailed construction of the controller and series-parallel switch-actuating mechanism, which will be described in the following specification and clearly pointed out in the appended claims.

The construction hereinafter described, in addition to the advantages above enumerated, allows a greater number of contact steps or segments to be arranged circumferentially on the resistance-controlling-switch cylinder without unduly enlarging the controller.

In the accompanying drawings, which illustrate the preferred embodiment of my invention, Figure 1 is an elevation, partly in section, of the controller with the front casing-cover removed. Fig. 2 is a plan view of the controller-casing, showing the notched sector which is employed with this controller. Fig. 3 is a sectional plan view on the line 3 3 of Fig. 1. Figs. 4, 5, and 6 are detailed views of the actuating mechanism for the series-parallel switch, and Fig. 7 is a diagrammatic representation of enough of a motor-control system having a motor-controller of the separately-actuated contact type to show how my invention is applied to the master-controller of such a system.

Referring now to Figs. 1 to 6, inclusive, of the drawings, A represents the back of the controller-casing, upon which the controlling mechanism is mounted. The resistance-controlling switch is indicated at B and comprises the cylinders B' and B², carrying the customary contact-segments b and b', respectively. The said cylinders are connected together by gearing G in such a manner as to cause the cylinder B' to rotate five times as fast as the cylinder B²—that is to say, the cylinder B' is passed through the same combinations practically five times while the cylinder B² is passing through two hundred and seventy degrees, its full range of movement. The shaft D, upon which the cylinder B² is mounted, extends through an opening in the cap-plate A', the said cap-plate forming a bearing for the upper end of said shaft. Fastened to the upper end of the shaft D by means of the set-screw g is an operating-handle E, in which is mounted a knob E', which is adapted to be engaged by the palm or thumb of the operator's hand and depressed when desired. Operatively connected to said handle E and controlled by the knob E' through mechanism to be hereinafter described is a series-parallel switch H. The reversing-switch RS is operated by the handle r, and the customary interlocking device K is provided between said reversing-switch and the shaft D. The interlocking lever of said device is pivoted at k', Fig. 3. The short arm k² of said lever engages the notched plate k³ of the reversing-switch, and the long arm k⁴ of said lever engages the notch k⁵ in a collar rigidly fastened to the shaft D. The specific construction and arrangement of the resistance-controlling switch and of the interlocking mechanism form no part of my present invention. The resistance-controlling switch is formed in two parts B' and B² to reduce the size of the controller required to control the operation of a large number of motor-controller contacts in a train-control system through a small number of train-wires in such a manner as shown and described in the application of Frank E. Case, Serial No. 174,388, filed concurrently herewith.

When the handle E is moved forward from its off position, (indicated at n, Fig. 2,) through the operative positions of the controller indicated by the notches on the notched sector S², without first depressing the knob E' in the off position, the motors are connected in series with each other and with a large resistance and then said resistance is cut out step by step until the controller-handle reaches the point indicated by m, Fig. 2, the motors being then connected in full series. When the handle is moved forward through the same operative positions as above indicated, after having depressed the knob E' the series-parallel switch H is operated and the motors are connected in parallel at first in series with a great resistance and then without resistance. The actuating mechanism for said series-parallel switch will now be described. Pivoted at 8 in the controller-handle is a lever 7, upon the outer end of which the spindle 6, attached to the knob E', is adapted to rest. Engaging with said lever 7 is the short arm 9' of the lever 9, pivoted at 10 in the said controller-handle. The long arm 11 of said lever is adapted to engage the notches 13 of the notched sector S² as the handle is moved forward. The spring 12 is provided for the purpose of maintaining the long arm 11 in engagement with said notched sector until the said arm has been moved out of said engagement by the depression of the knob E' by the motorman. By means of the engagement of the lever-arm 11 with the notches in said sector the controller-handle is locked in any desired position and is unlocked from said position by the movement of the same knob which controls the series-parallel switch. The movement of the knob E' so as to unlock the handle to notch up the controller does not interfere with the operation of the series-parallel switch. The short arm 9' of the lever 9 is adapted to engage the upper end of a bolt 14, mounted in the keyway in the shaft D. The lower end of said bolt 14 engages with a lever-arm or catch 17, which is pivotally mounted on the shaft D at 17. This catch 16, which is more clearly shown in Figs. 3 and 4, is bifurcated at its inner end and embraces the shaft D. The said catch 16 is adapted to rotate with the shaft D and its outer end has a vertical movement relative to said shaft. A spring 17' tends to maintain the catch 16 in its raised position. The outer end of said catch 16 is adapted to engage either the upper surface or the under surface of the annular ring 15, which is rigidly fastened to bosses 15', formed on the cap-plate of the controller-casing. A slot or notch 19, Fig. 5, is provided in said ring for the purpose of allowing the outer end of said catch 16 to pass freely through said ring. This slot is located in a position corresponding to the off position of the controller and at no other place in its travel is it possible for the catch 16 to pass from one side of the ring 15 to the other side. When an attempt is made to depress the bolt 14 in any position of the controlling-handle other than that corresponding to the off position of the controller, no effect will be produced upon the catch 16; but when it is depressed in the off position of the controller it causes the catch 16 to move into a position substantially at right angles with the axis of the shaft D, the outer end of said catch passing through the slot 19 to the under side of the ring 15.

Loosely mounted on the shaft D just below the fixed annular ring 15 is a collar 24, having formed on its under surface a cam-slot 25, in which a roller 26, (see specially Figs. 1 and 6,) carried by the lever-arm 28, is adapted to engage. The said lever-arm 28 is pivoted to the back of the controller-casing at 27 and is slotted at 29 at its opposite end to receive the pin 30, carried by the arm 31, which is rigidly fastened to the movable member of the series-parallel switch H. The series-parallel switch H carries a contact-plate 32, which is adapted to engage, respectively, with the fingers 33 and 34, mounted on the insulating-base 35, rigidly fastened to the back of the controller-casing.

Mounted on the upper side of the collar 24 is a U-shaped lug 20, which normally occupies a position directly under the slot 19 in the annular ring 15, so that when the catch 16 is depressed and the outer end of said catch passes through the slot 19 said outer end passes between the arms of the U-shaped lug, thereby locking the collar 24 to the shaft D. Thus as the handle E is moved forward into its first operative position after the knob E' has been depressed in the off position the collar 24 will move therewith and cause the series-parallel switch to rotate, since the cam-slot 25 is so formed that the roller 26 will move through the inclined portion 24' of said cam-slot. The U-shaped lug 20 has also mounted between its arms the lever-arm 21, pivoted at 22 and provided with a spring 23, which tends to maintain the arm 21 in its raised position. When the outer end of the catch 16 is above the ring 15 and out of engagement with the U-shaped lug 20, the arm 21 engages with the slot 19 in the said ring, as is clearly shown in Fig. 5, thereby locking the collar 24, so as to prevent it from rotating with the shaft D as the controller-handle is moved forward through its operative positions.

The shaft $h$, upon which the movable member of the series-parallel switch is mounted, carries at its upper end, which projects through the cap-plate A', a cap $h'$, provided with a pointer $h^2$, which serves to indicate to the motorman the position of the series-parallel switch. When the pointer $h^2$ is opposite the stud S' on the cap-plate A', the switch is in its series position, as shown in Figs. 3, 5, and 6, and when said pointer is opposite the stud P' the switch is in its parallel position, as shown in Figs. 1 and 4.

In Fig. 7 of the drawings I have illustrated diagrammatically a system of motor control in which the motor-controller MC is composed of a plurality of separately-actuated contacts controlled from a master-controller M. For convenience and clearness of illustrating I have merely indicated sufficient of the system to show the connections between the series-parallel switch in the master-controller and the contacts of the motor-controller which control the connections for series and parallel relationship of the motors. The motor or power circuit is also shown separate and distinct from the control-circuit for the sake of clearness. The contact-segments of the resistance-controlling switch B in the master-controller are represented diagrammatically in development, as is customary in illustrating such structures. The contacts of the motor-controller which control the series connections of the motors M' and M² are indicated by T T, R', and S. The contacts of the motor-controller which control the parallel connections of the motors M' and M² are indicated by T T, R', P, and P. It will be understood that a great number of additional separately-actuated contacts are employed to regulate the amount of resistance which is connected in series with the motors in both the parallel and series relationship. The first section of said resistance is indicated by $R^a$. These resistance-controlling separately-actuated contacts are controlled by the master-controller through the connections $a'$ to $j'$, inclusive, and $a^2$ to $h^2$, inclusive, which engage with the contact-segments $a^3$ to $j^3$, inclusive, on the cylinder B' and the contact-segments $a^4$ to $h^4$, inclusive, on the cylinder $B^2$, respectively. The contact S carries an auxiliary switch $s$, which acts to open the control-circuit through the actuating-coils of the parallel contacts when the series connections are made, and one of the parallel contacts P carries an auxiliary switch $p$, which is adapted to open the series control-circuit when the parallel connections are made. The control-circuits through the actuating-coils of the series contacts and parallel contacts are under the control of the series-parallel switch H in the master-controller.

A more detailed description of a motor-control system, such as herein referred to, employing separately-actuated contacts controlled by a master-controller may be obtained from the patent to Perry, No. 687,060, granted November 19, 1901.

When it is desired to start the motors in series, the controlling-handle E is moved forward from its off position without depressing the knob E'. As the handle is moved forward with the customary notching-up movement by depressing the knob E' to unlock said handle the collar 24 is not moved with the shaft D, since it is locked in a position corresponding to the off position of the controller by means of the arm 21, which now engages the notch 19 in the fixed ring 15. The series-parallel switch H is thus held in such a position that the contact-plate 32 engages with the contact-fingers 34, as shown in Fig. 3. Therefore when the controlling-handle reaches the first operative position of the controller a control-circuit is completed, which can be traced on Fig. 7 as follows: from the trolley or line conductor L' through the contact-finger $a^2$, contact-segments $a^4$ and $b^4$, contact-finger $b^2$, conductor 40, actuating-coils of contacts T' T' and R', conductor 41, through the auxiliary switch $p$, actuating-coil of the contact S, conductor 42, contact-fingers 34, and plate 32 of the series-parallel switch H, conductor 43, contact-finger $g^2$, contact-segments $g^4$ and $h^4$, contact-finger $h^2$ to ground at G. This connects the motors in series, and the power-circuit thus completed may be traced as follows: from trolley L through contacts T and T in parallel, through contact R', resistance $R^a$, motor M', conductor 46, contact S, and motor $M^2$ to ground.

When it is desired to connect the motors in parallel, the controlling-handle is moved back to its initial or off position, and the knob E' in the controller-handle is depressed to such an extent that the short arm 9' of the lever 9 engages the bolt 14, depressing it into engagement with the catch 16. The outer end of said catch is thus forced through the notch 19 into engagement with the U-shaped lug 20, and the locking-arm 21 is moved by the catch 16 out of engagement with the slot 19. The collar 24, carrying the U-shaped lug 20, is thus locked to the shaft D, and as the controlling-handle is moved forward into its first operative position the said collar is moved with the shaft D, and the roller 26, carried by the lever-arm, is constrained to follow the inclined part 24' of the cam-slot 25, thereby moving said lever-arm 28 about its pivot 27 and forcing the movable member of the series-parallel switch H into its parallel position. The motors are thus connected in parallel, and the control-circuit corresponding to this position may be traced on Fig. 7 as follows: from the line or trolley L' through the contact-finger $a^2$, contact-segments $a^4$ and $b^4$, contact-finger $b^2$, conductor 40, actuating-coils of the contacts T, T, and R', conductor 41, auxiliary switch $s$, carried by the contactor S, actuating-coils of the contacts P and P, conductor 44, contact-fingers 33 and plate 32 of the series-parallel switch, conductor 43, contact-fingers $g^2$, contact-segments $g^4$ and $h^4$, contact-finger $h^2$ to ground at G. The power-circuit corresponding to this position may be traced as follows: from trolley L through contacts T and T in parallel, contact R', resistance $R^a$, motor M', conductor 46, and one of contacts P to ground, and also from the resistance $R^a$ through conductor 45, the other contact P and motor $M^2$ to ground. Throughout the subsequent operative positions of the resistance-controlling switch the roller 26 engages the circular part of the cam-groove 25, and the series-parallel switch is thus locked in its parallel position. It will be understood that the parallel connections may be made at the start, if so desired, without first connecting the motors in series.

In the claims hereunto appended I aim to cover all the modifications of the device herein shown and described which do not involve a departure from the spirit and scope of my invention.

What I claim as new, and desire to secure by Letters Patent of the United States, is—

1. In a controller, a resistance-controlling device, a series-parallel controlling device, means for causing said series-parallel controlling device to be maintained in one of its operative positions, and means for causing it to be moved into another of its operative positions as the operating-handle of said resistance-controlling device is moved forward from its "off" position.

2. In a controller, a resistance-controlling device, a series-parallel controlling device, a handle for operating both of said devices, means for locking said series-parallel controlling device in one of its operative positions while said resistance-controlling device is moved through its operative positions by said handle, and means for rendering said locking means inoperative.

3. In a controller, a resistance-controlling device, a series-parallel controlling device, means for connecting said series-parallel controlling device to said resistance-controlling device at the initial or "off" position of said resistance-controlling device, and means for causing said series-parallel controlling device to move from one of its operative positions to another as said resistance-controlling device is moved forward.

4. In a controller, a resistance-controlling device, a series-parallel controlling device, means for connecting said series-parallel controlling device to said resistance-controlling device at the initial or "off" position of said resistance-controlling device, means for causing said series-parallel controlling device to move from one of its operative positions to another as said resistance-controlling device is moved forward, and means for rendering said connecting means inoperative in any operative position of said resistance-controlling device.

5. In a controller, a resistance-controlling device, a series-parallel controlling device, means for connecting said series-parallel controlling device to said resistance-controlling device at the initial or "off" position of said resistance-controlling device, means for causing said series-parallel controlling device to move from one of its operative positions to another as said resistance-controlling device is moved forward, and means for locking said device in its last-mentioned operative position while said resistance-controlling device is moved through its operative positions.

6. In a controller, a resistance-controlling device, a handle for operating said device, a series-parallel controlling device, and means operated by a button in said handle for connecting said series-parallel controlling device to said resistance-controlling device, whereby said series-parallel device is moved from one operative position to another when said handle is moved forward.

7. In a controller, a resistance-controlling device, a handle for operating said device, an auxiliary controlling device, means operated by a button in said handle for connecting said auxiliary controlling device to said resistance-controlling device, whereby said auxiliary controlling device is moved from one operative position to another by the initial movement of said handle, and means for locking said auxiliary controlling device in the latter position in all the subsequent positions of the operating-handle.

8. In a controller, a resistance-controlling device, a handle for operating said device, a series-parallel controlling device, means for locking said series-parallel controlling device in one of its operative positions, and means operated from said controller-handle for rendering said locking means inoperative and for connecting said series-parallel controlling device to said resistance-controlling device so that the said series-parallel controlling device will be moved from one of its operative positions to the other as said handle is moved forward.

9. In a controller, a resistance-controlling device, a series-parallel controlling device normally disconnected from said resistance-controlling device, a single handle for operating both devices, means for connecting said series-parallel controlling device to said handle, and means for indicating to the operator the position of said series-parallel controlling device.

10. In a controller for electric motors, a resistance-controlling device, a handle for operating said device, a series-parallel controlling device normally in its series position, and means carried by said handle for causing said series-parallel controlling-switch to be moved into its parallel position as the controller-handle is moved forward.

11. In a controller for electric motors, a resistance-controlling device, a handle for operating said device, a series-parallel controlling device, means for locking said series-parallel controlling device in its series position whereby said controller-handle may be moved through its operative positions without affecting the series-parallel controlling device, and means for rendering said locking means inoperative and for causing said series-parallel controlling device to be moved into its parallel position as the resistance-controlling device is moved forward.

12. In a motor-control system, a plurality of motors, a motor-controller adapted to connect the motors either in series or in parallel, a master-controller for said motor-controller, and a series-parallel controlling device adapted when in one position to cause said motor-controller to connect the motors in series and when in another position to cause the motor-controller to connect the motors in parallel as the operating-handle of said master-controller is moved forward from its initial or "off" position.

13. In a motor-control system, a plurality of motors, a motor-controller adapted to connect the motors either in series or in parallel, a master-controller for said motor-controller comprising a resistance-controlling device, a handle for operating said device, a series-parallel controlling device, and means operated from said controller-handle for determining the position of said series-parallel controlling device, said series-parallel controlling device being adapted when in one position to cause the motor-controller to connect the motors in series and when in another position to cause the motor-controller to connect the motors in parallel as the master-controller handle is moved forward from its initial or "off" position.

14. In a motor-control system, a plurality of motors, a motor-controller made up of a plurality of separately-actuated contacts, a master-controller for controlling the operation of said motor-controller, said master-controller comprising a resistance-controlling device, a handle for operating said device, a series-parallel controlling device adapted when in one position to cause said motor-controller to connect the motors in series and when in another position to cause the motor-controller to connect the motors in parallel, means carried by said handle for controlling the operation of said series-parallel controlling device, and means for causing said series-parallel controlling device to be moved from one of its operative positions to another when the controlling means for said series-parallel controlling device is operated and said handle is moved forward.

15. In combination, a controller of the separately-actuated contact type, comprising resistance-controlling switches and series-parallel switches, electromagnets for operating the several switches, actuating-circuits therefor, and a master-controller comprising a resistance-controlling switch and a series-parallel switch, the series-parallel switch having its contacts arranged when in one position to partially close the actuating-circuit for operating the series contacts of the motor-controller and when in its other position to partially close the actuating-circuit for operating the parallel contacts of the said controller, and the resistance-switch having contacts arranged to complete the said circuits which are partially completed by the series-parallel switch.

16. In combination, a controller of the separately-actuated contact type, comprising resistance-controlling switches and series-parallel switches, electromagnets for operating the several switches, actuating-circuits therefor, a master-controller comprising a resistance-controlling switch and a series-parallel switch, the series-parallel switch having its contacts arranged when in one position to close the actuating-circuit for operating the series contacts of the motor-controller and when in its other position to close the actuating-circuit for operating the parallel contacts of the said controller, an operating-handle for the resistance-switch of the master-controller, and means operated from said handle for determining the position of the series-parallel switch.

17. In combination, a controller of the separately-actuated contact type, comprising resistance-controlling switches and series-parallel switches, electromagnets for operating the several switches, actuating-circuits therefor, a master-controller comprising a resistance-controlling switch and a series-parallel switch, the series-parallel switch having its contacts arranged when in one position to close the actuating-circuit for operating the series contact of the motor-controller and when in its other position to close the actuating-circuit for operating the parallel contacts of the said controller, an operating-handle for the resistance-switch of the master-controller, and means for operatively connecting the series-parallel switch to the said handle so that it will be operated as the handle is moved forward from its initial or "off" position.

18. In a controller, a resistance-controlling device, a handle for operating said device, an auxiliary controlling device, means whereby said auxiliary controlling device is moved from one operative position to another by the initial movement of the said operating-handle, and means for locking said auxiliary controlling device in the latter position in all the subsequent positions of the operating-handle.

In witness whereof I have hereunto set my hand this 22d day of September, 1903.

CHARLES E. BARRY.

Witnesses:
G. C. HOLLISTER,
HELEN ORFORD.